3,502,956

RECTIFIER DEVICE WITH SILICON SEMICONDUCTOR RECTIFYING ELEMENTS DISPOSED RESPECTIVELY IN DISC-SHAPED HOUSINGS ABUTTING STACKABLE COOLING MEMBERS

Paul Fries and Alfons Staudt, Erlangen, Germany, assignors to Siemens Aktiengesellschaft, Berlin, Germany, a corporation of Germany Filed Oct. 23, 1968, Ser. No. 769,865
Claims priority, application Germany, Oct. 26, 1967, S 112,577
Int. Cl. H02m 7/20
U.S. Cl. 321—8 12 Claims

ABSTRACT OF THE DISCLOSURE

Rectifier device includes a plurality of rectifier disc cells, respectively having a disc-shaped housing and a semiconductor diode contained therein, and a plurality of cooling members, the rectifier disc cells and the cooling members being mounted in at least two stacks disposed substantially parallel to one another, each of the rectifier disc cells having a cooling member on opposite sides thereof in the respective stack, and a pair of tensioning yokes located respectively at each end of the parallel stacks and engaging the end cooling members at a respective end of both said stacks so as to clamp the stacks therebetween, the end cooling members at an end of the stack being electrically connected to one another so that they are at the same electric potential.

Our invention relates to rectifier device with silicon semiconductor rectifying elements or diodes, more particularly, disposed respectively in substantially disc-shaped housings abutting stackable cooling members. These so-called disc cells formed thereby are suited for high currents of for example 1000 amperes or more.

The liquid cooling system for such disc cells permits the cooling member to have a relatively small size and an improved cooling action, and consequently affords removal of relatively greater waste heat output from each cell.

The cooling members are generally made in the form of flat, and especially cylindrical, cooling boxes or capsules.

Since two cooling members are associated with each cell of the heretofore known current rectifier devices constructed with such disc cell components, it follows that a relatively great amount of space is required for a device having a large number of such cells and it is possible that the device will have a configuration that is relatively difficult to construct. Each component formed of cooling members and cells must be provided with a tensioning device by means of which the transfer resistance between cell housing and cooling member is kept small by the application of relatively high pressure thereto.

It is accordingly an object of our invention to provide rectifier device of the aforementioned type which avoids the disadvantages of the heretofore known rectifier devices of this general type and which, more specifically, has an even more simplified construction and affords greater space-saving assembly of the entire device.

It is a more specific object of our invention to provide such rectifier device with a relatively greater number of rectifier cells by suitably stacking the disc-shaped cells with their associated flat cooling members into a unitary structure.

With the foregoing and other objects in view, in accordance with our invention, we stack a plurality of rectifier cells with respective fluid cooling members into a columnar structural unit, and provide the entire structural unit with a common clamping device.

More specifically according to the invention, we provide rectifying device comprising a plurality of rectifying disc cells, respectively, including a disc-shaped housing and a semiconductor diode contained therein, and a plurality of cooling members, the rectifying disc cells and the cooling members being mounted in at least two stacks disposed substantially parallel to one another, each of the rectifying disc cells having a cooling member on opposite sides thereof in the respective stack, and a pair of tensioning yokes located respectively at each end of the parallel stacks and engaging respectively the end cooling members of both stacks so as to clamp the stacks therebetween, the end cooling members at one end of the stacks being electrically connected to one another so that they are at the same electric potential.

In accordance with a further feature of the invention, the rectifier device is provided with input and output leads connected to the stacks and extending transversely in substantially one direction therefrom. Since the rectifier device of the invention is suitable for producing with relatively few rectifier elements a load current of several thousands of amperes, the current input and output leads, in accordance with the invention, are provided with a correspondingly large cross section for carrying such current.

It is well known that relatively great waste heat produced for such load currents in rectifier devices having especially compact structure promotes the formation of undue thermal stresses within the stack of rectifier elements. Thus, according to another feature of the invention, we provide elastic intermediate members by which the current input and output leads, from which the stacks may be suspended, are connected to the coolant members and the rectifying disc cells associated therewith.

Other features which are considered as characteristic for the invention are set forth in the appended claims.

Although the invention is illustrated and described herein as embodied in rectifier device, it is nevertheless not intended to be limited to the details shown, since various modifications and structural changes may be made therein without departing from the spirit of the invention.

The construction and method of operation of the invention, however, together with additional objects and advantages thereof will be best understood from the following description of specific embodiments when read in connection with the accompanying drawings, in which.

Figure 1:
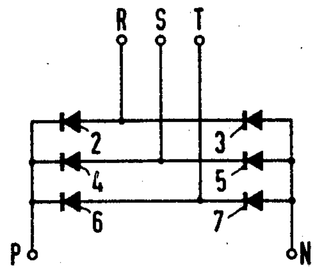
FIG. 1 is a circuit diagram of a rectifier device according to our invention showing the semiconductor elements or diodes thereof in bridge circuit.

Referring now to the drawings, and first particularly to FIG. 1 thereof, there is schematically shown a bridge circuit of six current semiconductor rectifier elements or diodes 2 to 7. The diodes 2 to 7 can be, for example, non-controlled silicon rectifiers or diodes or thyristors for high current strengths, which are respectively disposed in disc-shaped housings, the resulting packages being hereinafter referred to as disc cells. Alternating current input leads R, S and T feed the bridge circuit, and direct current output leads P and N permit withdrawal of the rectified current therefrom.

Figure 2:
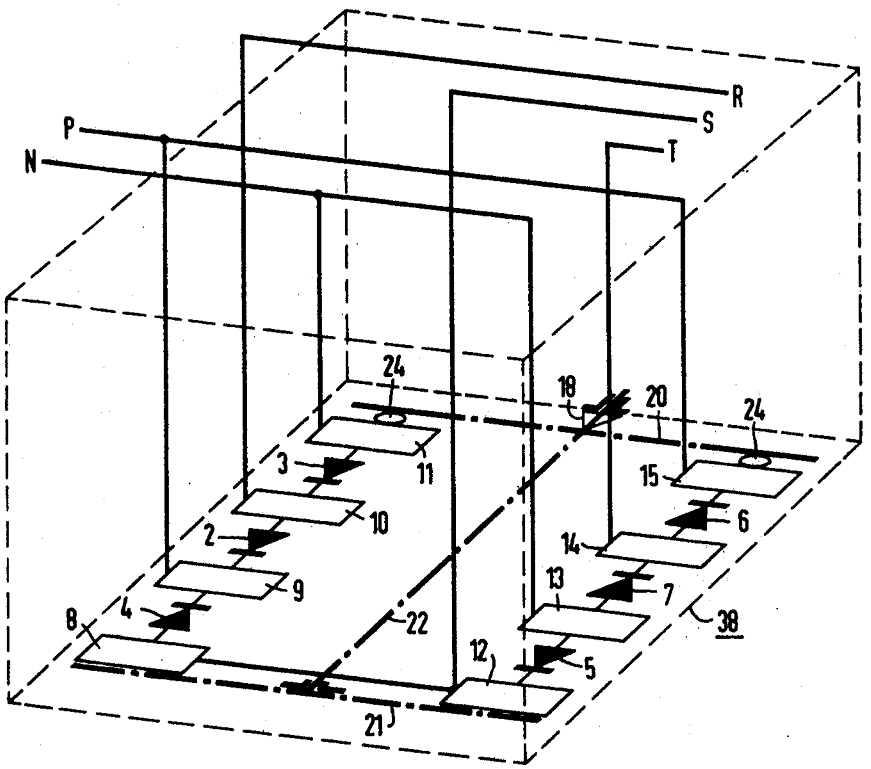
FIG. 2 is a diagrammatic view of the rectifier device showing the spatial arrangement of the diodes, cooling members and other associated components.
Figure 3:
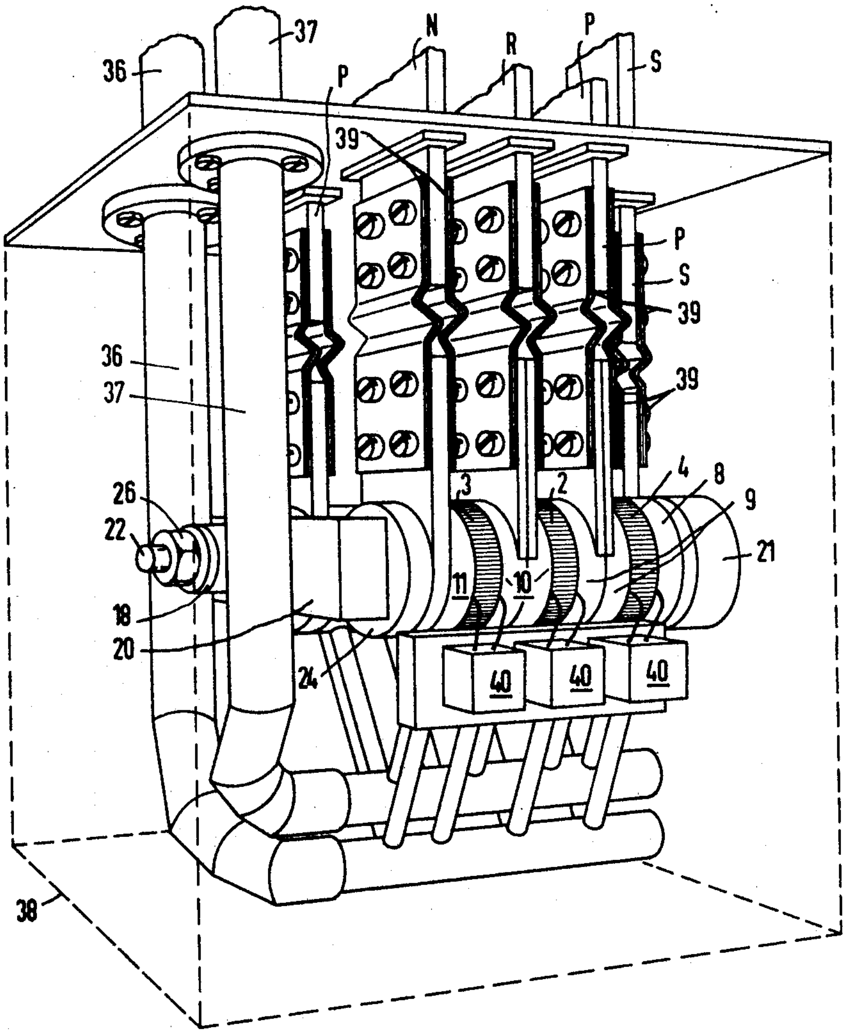
FIG. 3 is a perspective view of the rectifier device shown diagrammatically in FIG. 2.

As shown in the diagrammatic and actual spatial views of FIGS. 2 and 3, diodes 2 to 7 are located respectively between pairs of cooling members 8 to 15. The diodes 2 to 4 and the respective cooling members 8 to 11 together form one stack of alternating diodes and cooling members, and the diodes 5 to 7 and cooling members 12 to 15 together form another similar stack. Both stacks are disposed parallel to or nearly parallel to one another and are clamped between two tensioning yokes 20 and 21 by means of a tensioning member 22. The end cooling members 8 and 12 of the respective stacks are electrically connected and are consequently at the same potential. The means for electrically connecting the end cooling members 8 and 12 so that they have the same potential can advantageously be afforded simultaneously by the tensioning yoke 21. If both of the stacks of diodes are to be vertically disposed, the tensioning member 22 connected with the equipotential connection 20 of the end cooling members 8 and 12, can serve simultaneously as one of the current leads, such as the alternating current input lead S. The compressive force applied to the tensioning yoke 20 can be transmitted thereto through the bearing 18. The tensioning yoke 20 is turnably mounted on the tensioning member 22, which may be in the form of a threaded bolt, for example. At both ends of the tensioning yoke 20, there is provided a bearing member or seat 24, which can be spherical in shape (FIG. 2), that transmits the compressive force from the yoke 20 to the stacks of diodes and cooling members. A nut 26 is threaded on the bolt 22 so as to exert a compressive force against the bearing 18 and consequently through the yoke 20 and the seat or bearing members 24 to the stacks of diodes and cooling members.

It may be possibly advantageous to produce the compressive force by providing a suitable screw device at the seat members 24.

The tensioning yoke 20 is pivotable about the bearing 18 much like a see-saw. The compressive force on the stacks of semiconductor diodes can be produced as well by applying pressure on the bearing 18 in direction toward one of the ends of the tensioning section 20 or in opposite direction. The clamping together of all the current rectifier diodes of the device with the respective coolant members thereof can thus be effected, in a relatively simple manner in accordance with the invention, for example by means of a single screw. The assembly or disassembly or the removal of a defective diode or of an associated cooling member can thus be carried out quite simply and in a relatively short time.

As shown in FIG. 3, the direct and alternating current leads are constructed as rails and are disposed substantially perpendicularly to the axis of the stacks of diodes contained within their individual housings. Of the cooling members, which can advantageously be liquid or vapor cooled members, the cooling members 9, 10, 13 and 14 respectively adjacent the leads P, N, R and T are identified by the same reference numeral. The coolant circulatory loop is represented in FIG. 3 only by the ends of the coolant conduits 36 and 37, which are formed with a plurality of conduit branches, respectively, serving to supply coolant to the cooling members and to withdraw the coolant therefrom. The conduit ends 36 and 37 and the respective branch conduits can, for example, be made of plastic material, and can be prefabricated by welding the branch conduits to the conduit ends 36 and 37.

The rail-shaped current input and output leads are respectively connected to a cooling member through elastic or springy electrically conductive intermediate members 39. For the purpose of installing or exchanging the semiconductor elements 2 to 7, they need only be introduced between the adjacent spring pairs 39, as seen in FIG. 3, until they come to rest in their fixed location between the respective cooling members. The fluid cooling conduits, which are made of plastic material so that they are insulators, therefore need not be removed.

An especially advantageous further embodiment of the rectifier device according to our invention provides the cooling members 8 to 15 with covers placed thereon that are able to be locked. For this purpose, a sealing intermediate layer or washer can be advantageously interposed between coolant member and cover. In such a device, the end of a current input or current output lead, respectively, can be provided as the cover for one of the cooling members. By means of the compressive force applied to the stacks of diodes, the respective opening of the cooling member is sealed by the connecting rail placed thereon.

Additional wiring elements for the diodes 2 to 7 or, in the case where the rectifier device is provided with thyristors, control elements 40, such as pulse transmitters, for example, for the thyristors, are disposed on the side of the stacks opposite that from which the input and output leads extend transversely. The disposition of the pulse transmitter 40 in the direct vicinity of the thyristors is advantageous in that distortion of the pulse by stray voltages in the control circuit can be substantially eliminated.

Due to the space-saving construction of the rectifier device of our invention, the device can be placed in a container 38 which can preferably be gas-tightly closed so as to prevent thereby the entry of water vapor from the outer atmosphere. The rectifier device of the invention can thereby also be operated at low temperatures, preferably at about 0° C. or even below 0° C., without fear of moisture condensation or ice formation on the electrically conductive components of the device.

If the rate of circulation of the coolant is chosen, in accordance with a further feature of the invention, so that it boils due to heat absorption in the cooling members 8 to 15, temperatures of the rectifier device can be attained down to about −30° C. By operating at such low temperatures, a corresponding increase in the current load of the diodes 2 to 7 of the current rectifier device of the invention, can be attained.

It can possibly be advantageous to vertically dispose the stacks of diodes within their individual housings i.e. the rectifying disc cells, and the cooling members associated therewith, and to connect the current input and output leads laterally to the stacks so that they extend horizontally. Also, the direct current leads P, N, on the one hand, and the alternating current leads R, S and T on the other hand, can extend from different sides of the stacks.

We claim:

1. Rectifier device comprising a plurality of rectifier disc cells, respectively, including a disc-shaped housing and a semiconductor rectifying element contained therein, and a plurality of cooling members, said rectifier disc cells and said cooling members being mounted in at least two stacks disposed substantially parallel to one another, each of said rectifier disc cells having a cooling member on opposite sides thereof in the respective stack, and a pair of tensioning yoke means located respectively at each end of the parallel stacks and engaging the end cooling members at a respective end of both said stacks so as to clamp said stacks therebetween, the end cooling members at an end of the stack being electrically connected to one another so that they are at the same electric potential.

2. Rectifier device according to claim 1, including current input and output leads connected through respective elastic intermediate members with said stacks, on one side thereof.

3. Rectifier device according to claim 2 wherein at least one of said leads serves as means for suspending said stacks.

4. Rectifier device according to claim 2 wherein one of said leads serves as means for electrically connecting said end cooling members so that they are at the same electric potential.

5. Rectifier device according to claim 1 including a container wherein said stacks are housed, said container being closed against the outer atmosphere.

6. Rectifier device according to claim 1, including fluid coolant conduits having branches connected respectively to said cooling members, said conduits being formed at least at end portions thereof of insulating plastic material.

7. Rectifier device according to claim 6 wherein the connecting ends of said conduits are clamped in said stacks.

8. Rectifier device according to claim 7, including current input and output leads connected to said stacks and formed as flat rails, the connecting ends of said rails serving as covers for said coolant members.

9. Rectifier device according to claim 1 including bearing means in contact with said tensioning yoke means at one end of said stacks, said bearing means being adapted to transmit a clamping force to said stacks.

10. Rectifier device according to claim 1 wherein said semi-conductor rectifying elements are thyristors, and including control elements for said thyristors located at said stacks and connected to said thyristors.

11. Rectifier device according to claim 10 wherein said control elements are pulse transmitters.

12. Rectifier device according to claim 1, including current input and output leads connected to said stacks and extending laterally thereto, said stacks being disposed in a vertical direction.

References Cited

UNITED STATES PATENTS

| | | |
|---|---|---|
| 1,748,012 | 2/1930 | Dooley. |
| 3,173,061 | 3/1965 | Storsand. |
| 3,400,307 | 9/1968 | Baker et al. |
| 3,447,118 | 5/1969 | Ferree. |

J. D. TRAMMELL, Primary Examiner

W. M. SHOOP, Jr., Assistant Examiner

U.S. Cl. X.R.

317—234; 321—11, 27